(12) United States Patent
Phuyal et al.

(10) Patent No.: US 11,832,307 B2
(45) Date of Patent: Nov. 28, 2023

(54) MEDIUM ACCESS CONTROL (MAC) CONTROL ELEMENT HANDLING FOR MULTICAST OR BROADCAST OPERATION

(71) Applicant: QUALCOMM Incorporated, San Diego, CA (US)

(72) Inventors: Umesh Phuyal, San Diego, CA (US); Alberto Rico Alvarino, San Diego, CA (US); Gavin Bernard Horn, La Jolla, CA (US); Miguel Griot, La Jolla, CA (US); Xipeng Zhu, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/948,999

(22) Filed: Oct. 8, 2020

(65) Prior Publication Data
US 2021/0112601 A1   Apr. 15, 2021

Related U.S. Application Data (60) Provisional application No. 62/913,476, filed on Oct. 10, 2019.

(51) Int. Cl.
*H04W 74/08* (2009.01)
*H04W 72/0446* (2023.01)
(Continued)

(52) U.S. Cl.
CPC ......... *H04W 74/0833* (2013.01); *H04W 4/06* (2013.01); *H04W 72/0446* (2013.01); *H04W 72/23* (2023.01)

(58) Field of Classification Search
CPC .......... H04W 74/0833; H04W 72/042; H04W 72/0446; H04W 4/06
See application file for complete search history.

(56) References Cited

U.S. PATENT DOCUMENTS

2007/0133458 A1* 6/2007 Chandra ............... H04L 5/0055
370/329
2009/0238128 A1* 9/2009 Park ......................... H04L 1/18
714/748
(Continued)

FOREIGN PATENT DOCUMENTS

| CN | 102056284 A | 5/2011 |
|---|---|---|
| CN | 102056284 A | 5/2011 |

(Continued)

OTHER PUBLICATIONS

Qualcomm Incorporated: "Delay Requirements for Active TCI State Switch for PDCCH and PDSCH", 3GPP Draft, 3GPPRAN4#91, R4-1906989 Delay Requirements for Active TCI State Switch for PDCCH and PDSCH, 3rd Generation Partnership Project (3GPP), Mobile Competence Centre, 650, Route Des Lucioles, F-06921 Sophi, vol. RAN WG4. No. Reno. USA, May 13, 2019-May 17, 2019, May 13, 2019 (May 13, 2019), XP051733833, 4 Pages, Retrieved from the Internet: URL:http://www.3gpp.org/ftp/Meetings%5F3GPP%5FSYNC/RAN4/Docs/R4%2D1906989%2Ezip [retrieved on May 13, 2019] section 2.2.2.
(Continued)

*Primary Examiner* — Brenda H Pham
(74) *Attorney, Agent, or Firm* — Harrity & Harrity LLP / Qualcomm (57) ABSTRACT

Various aspects of the present disclosure generally relate to wireless communication. In some aspects, a user equipment (UE) may receive a medium access control (MAC) control element (MAC CE) including a command to alter a configuration of the UE; identify a time to alter the configuration
(Continued)

of the UE based at least in part on at least one of a relative time indicator, an absolute time indicator, a triggering event, or a type of the MAC CE; and implement, at the time identified for altering the configuration of the UE, the command of the MAC CE to alter the configuration of the UE. Numerous other aspects are provided.

30 Claims, 5 Drawing Sheets

(51) Int. Cl.
*H04W 4/06* (2009.01)
*H04W 72/23* (2023.01)

(56) References Cited

U.S. PATENT DOCUMENTS

| | | | | |
|---|---|---|---|---|
| 2009/0257408 A1* | 10/2009 | Zhang | ............... | H04W 72/0446 370/336 |
| 2015/0055589 A1 | 2/2015 | Yerramalli et al. | | |
| 2019/0306911 A1* | 10/2019 | Hahn | ................ | H04W 72/0406 |
| 2019/0327760 A1* | 10/2019 | Holfeld | ................. | H04W 72/04 |
| 2021/0400556 A1* | 12/2021 | Määttanen | ........ | H04W 36/0085 |

FOREIGN PATENT DOCUMENTS

| EP | 3454613 A1 | 3/2019 |
|---|---|---|
| EP | 3454613 A1 | 3/2019 |

OTHER PUBLICATIONS

International Search Report and Written Opinion—PCT/US2020/070646—ISA/EPO—dated Jan. 19, 2021.
Qualcomm Incorporated: "Delay Requirements for Active TCI State Switch for PDCCH and PDSCH", 3GPP Draft, 3GPPRAN4#91, R4-1906989 Delay Requirements for Active TCI State Switch for PDCCH and PDSCH, 3rd Generation Partnership Project (3GPP), Mobile Competence Centre, 650, Route Des Lucioles, F-06921 SOPHI, vol. RAN WG4. No. Reno. USA, May 13, 2019-May 17, 2019, May 13, 2019 (May 13, 2019), XP051733833, 4 Pages, section 2.2.2.

* cited by examiner

MEDIUM ACCESS CONTROL (MAC) CONTROL ELEMENT HANDLING FOR MULTICAST OR BROADCAST OPERATION

CROSS-REFERENCE TO RELATED APPLICATION

This patent application claims priority to U.S. Provisional Patent Application No. 62/913,476, filed on Oct. 10, 2019, entitled "MEDIUM ACCESS CONTROL (MAC) CONTROL ELEMENT HANDLING FOR MULTICAST OR BROADCAST OPERATION," and assigned to the assignee hereof. The disclosure of the prior application is considered part of and is incorporated by reference into this patent application.

FIELD OF THE DISCLOSURE

Aspects of the present disclosure generally relate to wireless communication and, specifically, to techniques and apparatuses for medium access control (MAC) control element (CE) handling for multicast or broadcast operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In multicast or broadcast operation, a base station (BS) may transmit a communication to multiple UEs. For example, the BS may broadcast a single broadcast transmission of a MAC CE to multiple UEs to provide a command to the multiple UEs, such as a command relating to multicast or broadcast operation. In some cases, one or more of the multiple UEs may fail to receive the broadcast transmission. As a result, the BS may retransmit the broadcast transmission to ensure receipt by the multiple UEs. When broadcasting commands via MAC CEs to multiple UEs, a time instant at which each of the multiple UEs receives the broadcasted commands and implements the broadcasted commands may differ. In such examples, the BS and the multiple UEs may become misaligned, such as by a first UE implementing a new configuration based at least in part on the broadcasted commands while a second UE maintains an old configuration, which may result in poor network performance.

SUMMARY

In some aspects, a method of wireless communication, performed by a UE, may include receiving a MAC CE including a command to alter a configuration of the UE; identifying a time to alter the configuration of the UE based at least in part on at least one of a relative time indicator, an absolute time indicator, a triggering event, or a type of the MAC CE; and implementing, at the time identified for altering the configuration of the UE, the command of the MAC CE to alter the configuration of the UE.

In some aspects, a UE for wireless communication may include memory and one or more processors operatively coupled to the memory. The memory and the one or more processors may be configured to receive a MAC CE including a command to alter a configuration of the UE; identify a time to alter the configuration of the UE based at least in part on at least one of a relative time indicator, an absolute time indicator, a triggering event, or a type of the MAC CE; and implement, at the time identified for altering the configuration of the UE, the command of the MAC CE to alter the configuration of the UE.

In some aspects, a non-transitory computer-readable medium may store one or more instructions for wireless communication. The one or more instructions, when executed by one or more processors of a UE, may cause the one or more processors to: receive a MAC CE including a command to alter a configuration of the UE; identify a time to alter the configuration of the UE based at least in part on at least one of a relative time indicator, an absolute time indicator, a triggering event, or a type of the MAC CE; and implement, at the time identified for altering the configuration of the UE, the command of the MAC CE to alter the configuration of the UE.

In some aspects, an apparatus for wireless communication may include means for receiving a MAC CE including a command to alter a configuration of the apparatus; means for identifying a time to alter the configuration of the apparatus based at least in part on at least one of a relative time indicator, an absolute time indicator, a triggering event, or a type of the MAC CE; and means for implementing, at the time identified for altering the configuration of the apparatus, the command of the MAC CE to alter the configuration of the apparatus.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms among other examples, or combinations thereof (collectively referred to as "elements"). These elements may be implemented using hardware, software, or combinations thereof. Whether such elements are implemented as hardware or software depends upon the particular application and design constraints imposed on the overall system.

A base station (BS) may transmit a broadcast or multicast communication to multiple user equipments (UEs). For example, the BS may transmit a medium access control (MAC) control element (MAC CE) command to control a configuration of each UE. Based at least in part on receiving the MAC CE command, each UE may implement the MAC CE command to, for example, switch from a first communication configuration to a second communication configuration. However, when a BS is transmitting a single transmission as well as one or more retransmissions of the single transmission to multiple UEs, the multiple UEs may become misaligned with respect to respective communication configurations. For example, a first UE may receive the broadcast transmission at a first time and may switch from the first communication configuration to the second communication configuration. Subsequently, a second UE may receive the broadcast transmission at a second time that is after the first time and that is after the first UE has already started using the second communication configuration. This may occur, for example, as a result of the second UE being farther from the BS than the first UE. In such examples, the second UE may switch to the second communication configuration after the first UE switches to the second communication configuration. Similarly, a third UE may fail to receive the broadcast transmission and may, as a result, not receive the MAC CE until the BS retransmits the broadcast transmission. In such examples, the third UE may switch to the second communication configuration after both the first UE and the second UE switch to the second communication configuration. As a result, different UEs may be using different communication configurations at the same time, which may result in poor network performance, lost communications, interrupted service, among other examples.

Some aspects described herein provide for MAC CE handling for multicast or broadcast operation. For example, a UE may receive a broadcast or multicast transmission of a MAC CE and may identify a time to alter the configuration of the UE based at least in part on a relative time indicator, an absolute time indicator, a triggering event, or a type of the MAC CE. In such examples, the UE may delay implementing a command of the MAC CE until the identified time and may implement the command of the MAC CE when the identified time is reached. In this way, the UE and other UEs that receive the MAC CE ensure that a command of the MAC CE is implemented at the same time for each UE, thereby avoiding a misalignment of the UEs with the BS.

Figure 1:
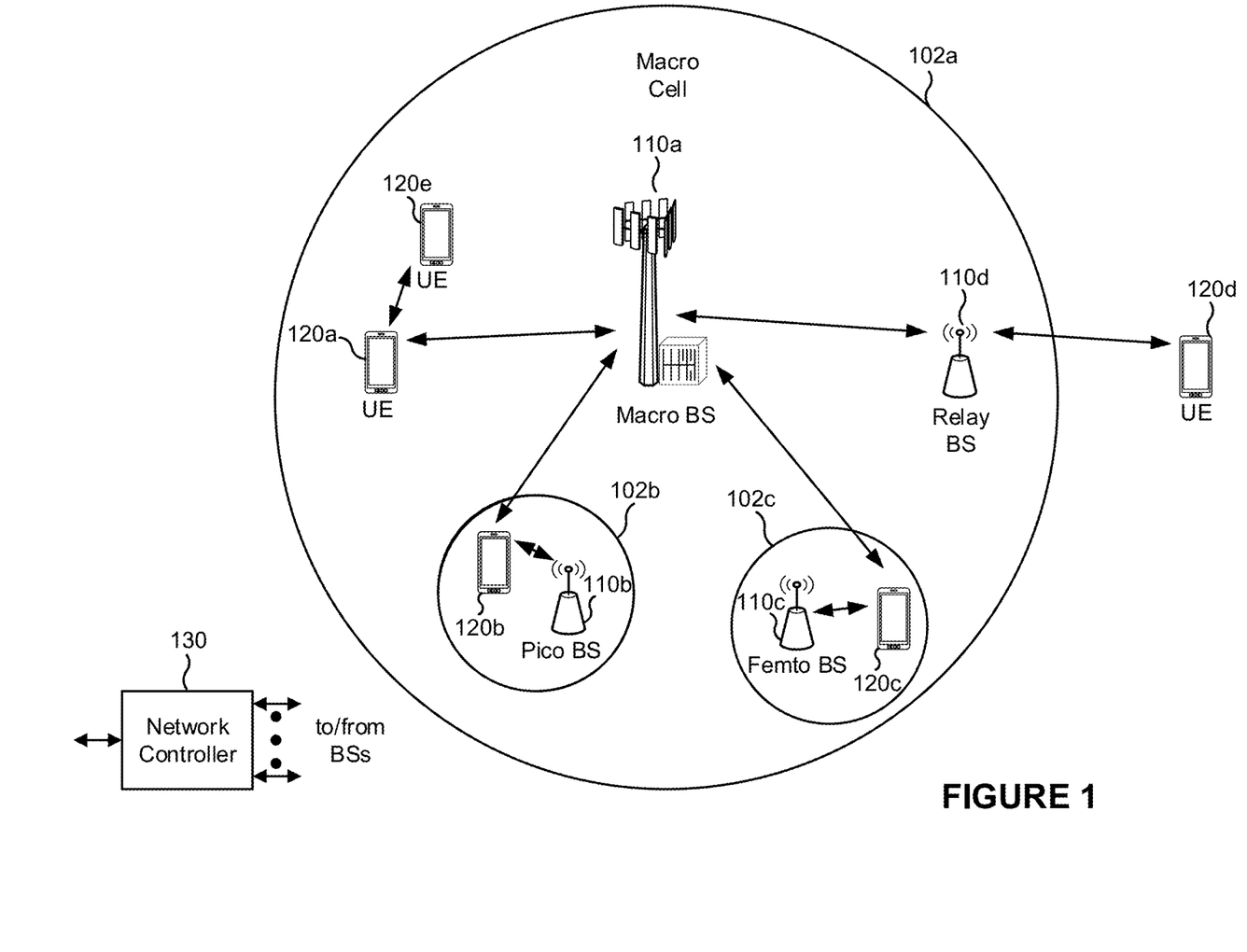
FIG. 1 is a block diagram illustrating an example wireless network in accordance with various aspects of the present disclosure.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of BSs 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP) among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol among other examples, or combinations thereof), or a mesh network among other examples, or combinations thereof. In such examples, the UE 120 may perform scheduling operations, resource selection operations, or other operations described elsewhere herein as being performed by the base station 110.

Figure 2:
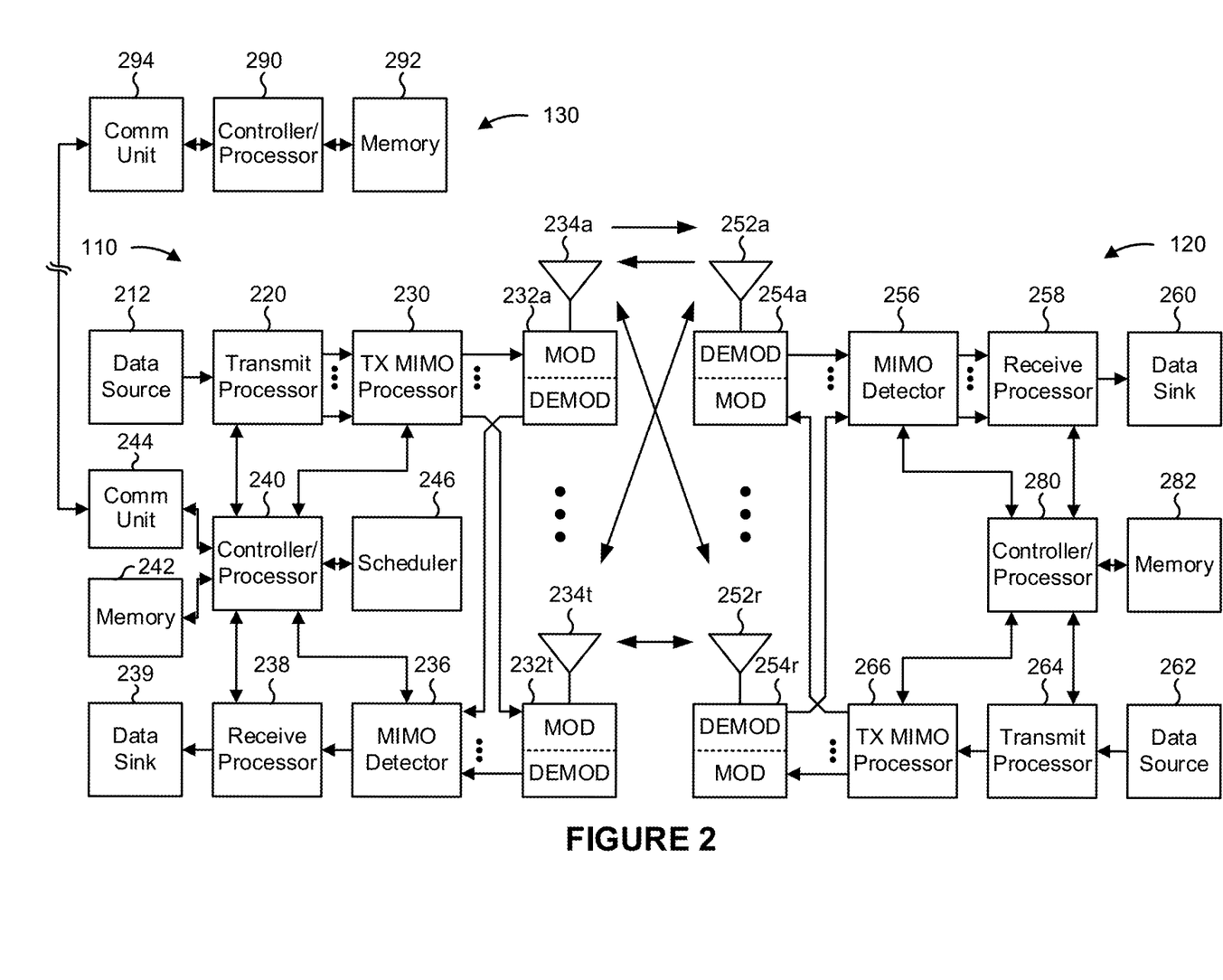
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE)

in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, or upper layer signaling among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM among other examples, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM) among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with MAC CE handling for multicast or broadcast operation, as described in more detail elsewhere herein. For example, controller/processor 240 of base station 110, controller/processor 280 of UE 120, or any other component(s) of FIG. 2 may perform or direct operations of, for example, the process of FIG. 4 or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a MAC CE including a command to alter a configuration of the UE, means for identifying a time to alter the configuration of the UE based at least in part on at least one of a relative time indicator, an absolute time indicator, a triggering event, or a type of the MAC CE, means for implementing, at the time identified for altering the configuration of the UE, the command of the MAC CE to alter the configuration of the UE, among other examples, or combinations thereof. In some aspects, such means may include one or more components of UE 120 described in connection with FIG. 2.

A BS may transmit a MAC CE command to control a configuration of multiple UEs using a broadcast or multicast transmission. Based at least in part on receiving the MAC CE command, each UE may implement the MAC CE command to, for example, switch from a first communication configuration to a second communication configuration. A first UE may receive the broadcast transmission at a first time and may immediately switch from the first communication configuration to the second communication configuration. A second UE may receive the broadcast transmission at a second time that is after the first time and after the first UE has already started using the second communication configuration, for example, as a result of the second UE being farther from the BS than the first UE. Consequently, the second UE may switch to the second communication configuration after the first UE switches to the second communication configuration. A third UE may fail to receive the broadcast transmission and may, as a result, not receive the MAC CE indicating the change to the second communication configuration until a BS retransmits the broadcast transmission. Consequently, the third UE may switch to the second communication configuration after both the first UE and the second UE switch to the second communication configuration. As a result, the first, second, and third UEs may, for a period of time, be using different communication configurations. This may result in poor network performance, lost communications, interrupted service, among other examples.

Some aspects described herein provide for MAC CE handling for multicast or broadcast operation. For example, a UE may receive, from a BS, a broadcast or multicast transmission of a MAC CE and may identify a time to alter the configuration of the UE based at least in part on a relative time indicator, an absolute time indicator, a triggering event, or a type of the MAC CE. In such examples, the UE and other UEs may delay implementing a command of the MAC CE until the identified time and may implement the MAC CE when the identified time is reached. In this way, the UE, the other UEs, and the BS ensure that a command of the MAC CE is implemented at the same time for each UE, thereby avoiding a misalignment of the UEs and the BS.

Figure 3:
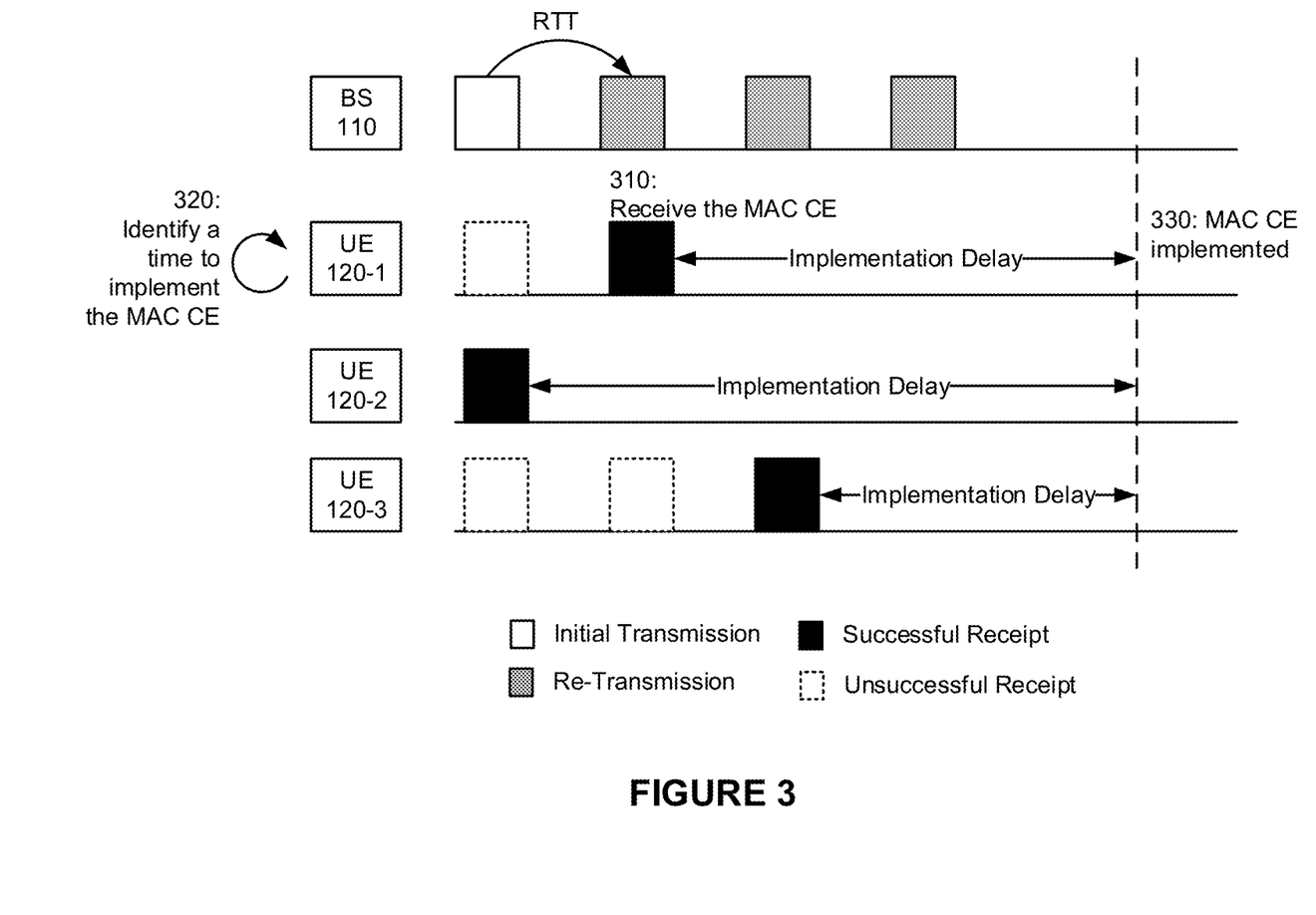
FIG. 3 is a diagram illustrating an example of medium access control (MAC) control element (CE) handling for multicast or broadcast operation in accordance with various aspects of the present disclosure.

FIG. 3 is a diagram illustrating MAC CE handling for multicast or broadcast operation in accordance with various aspects of the present disclosure. As shown in FIG. 3, a BS 110 may be in communication with a first UE 120-1, a second UE 120-2, a third UE 120-3, among other examples.

In a first operation 310, UE 120-2 may receive a MAC CE. For example, at a first time, BS 110 may broadcast the MAC CE and UE 120-2 may receive the broadcast. In contrast, UE 120-1 and UE 120-3 may fail to receive the broadcast. As a result, BS 110 may retransmit the broadcast of the MAC CE at a second time, which may enable UE 120-1 to receive the MAC CE, and at a third time, which may enable UE 120-3 to receive the MAC CE. In some aspects, BS 110 may retransmit the broadcast of the MAC CE based at least in part on using a retransmission timer or receiving hybrid automatic repeat request (HARM) feedback from a UE 120, among other examples.

In a second operation 320, UE 120-1 may identify a time to implement the MAC CE. For example, a UE 120, such as UE 120-1, may determine that implementation of the MAC CE is to be delayed by a particular period of time to enable each UE 120 to receive the MAC CE and implement a command of the MAC CE synchronously. In some aspects, UE 120-1 may determine the time at which to implement the MAC CE based at least in part on a relative timing indicator. For example, each UE 120 may receive an indicator with the MAC CE of a delay relative to one or more other communication parameters. Additionally or alternatively, UE 120-1 may receive radio resource control (RRC) signaling, associated with configuring a multicast radio bearer (MRB), that includes information identifying the delay, such as an offset parameter or a maximum quantity of HARQ retransmissions, among other examples. Additionally or alternatively, UE 120-1 may receive a downlink control information (DCI) transmission identifying the delay. For example, UE 120-1 may receive a DCI scheduling a downlink transport block set that is to convey a MAC protocol data unit (PDU) with a MAC CE and may identify the delay based on the DCI. Additionally or alternatively, UE 120-1 may determine the delay relative to the one or more other communication parameters based at least in part on a stored configuration. In some aspects, UE 120-1 may identify the delay based at least in part on a combination of two or more of RRC signaling, a DCI transmission, a stored configuration, among other examples.

In some aspects, UE 120-1 may determine the delay based at least in part on a HARQ round trip time (RTT). For example, UE 120-1 may determine a particular quantity of HARQ retransmissions that are configured for BS 110, such as a maximum quantity. Additionally, or alternatively, UE 120-1 may determine a value for the RTT, which represents a spacing between HARQ retransmissions. In such examples, UE 120-1 may determine to delay implementing the MAC CE until a time after the last HARQ retransmission is permitted to occur based at least in part on the particular quantity of HARQ retransmissions and the RTT. Additionally or alternatively, UE 120-1 may determine the delay based at least in part on an offset value. For example, UE 120 may delay beyond the last HARQ retransmission by the offset value to provide time for processing of the MAC CE, such as by another UE 120-1 receiving the MAC CE in the last HARQ retransmission.

In some aspects, UE 120-1 may determine the delay based at least in part on the type of the MAC CE or a command thereof. For example, UE 120-1 may determine a first delay for a discontinuous reception (DRX) command and a second delay for another type of command. In some aspects, UE 120-1 may determine a time to implement the MAC CE based at least in part on an absolute time indicator. For example, UE 120-1 may receive a MAC CE that includes information identifying a system frame number (SFN) or a slot number. Additionally or alternatively, UE 120 may receive information identifying a set of least significant bits (LSBs) of an SFN along with the identification of a slot number, thereby reducing an overhead associated with the MAC CE relative to including information identifying a whole SFN. Additionally or alternatively, UE 120-1 may receive information identifying an offset to an absolute time. For example, UE 120-1 may receive information identifying an offset amount to a time information message, identifying a specified time, of a system information block (SIB) type 9 (SIBS) and may determine to implement the MAC CE at the offset time after a time information message identifying the specified time. Additionally or alternatively, UE 120-1 may receive information identifying an absolute time at which to implement the MAC CE, such as a coordinated universal time (UTC) value.

In some aspects, UE 120-1 may monitor for another signal to determine when to implement the MAC CE. For example, after receiving a broadcast transmission including the MAC CE, UE 120-1 may monitor for a group radio network temporary identifier (G-RNTI) and a cell radio network temporary identifier (C-RNTI). In such an example, UE 120-1 may determine a time at which to implement the MAC CE based at least in part on whether UE 120-1 is scheduled for transmission using the C-RNTI. Additionally or alternatively, UE 120-1 may determine to implement the MAC CE based at least in part on detecting network traffic on a radio bearer associated with implementing the MAC CE, such as a radio bearer that the MAC CE indicates UE 120-1 is to monitor after implementing the MAC CE. In this way, BS 110 may detect whether UE 120-1 has implemented the MAC CE, thereby enabling BS 110 to maintain alignment with UE 120-1 even when different UEs 120-1 implement the MAC CE at different times.

In another example, BS 110 may select a type of transmission for the MAC CE based at least in part on the type of MAC CE. For example, for a first type of MAC CE that may cause a misalignment when UEs 120-1 implement the MAC CEs at different times, BS 110 may determine to transmit the first type of MAC CE as a unicast transmission. In such examples, UE 120-1 may detect that a received MAC CE is conveyed in a unicast transmission and may determine to implement the received MAC CE based at least in part on the unicast transmission enabling obviation of misalignment errors. In such a case where the MAC CE is conveyed in a unicast transmission to UE 120-1, BS 110 may determine when the UE 120-1 received the MAC CE and implemented the MAC CE, thereby avoiding misalignment between UE-1 and BS 110. In contrast, for a second type of MAC CE, BS 110 may determine that an impact to network performance due to a potential misalignment relating to implementing the MAC CE is limited, BS 110 may determine to transmit the second type of MAC CE using a broadcast or multicast transmission. In such examples, UE 120-1 may detect the broadcast or multicast transmission and may immediately implement the received MAC CE based at least in part on the received MAC CE being of the second type.

In a third operation 330, UE 120-1 may implement the MAC CE. For example, UE 120-1 may apply a command of the MAC CE at a time that is synchronized with other UEs 120 and may switch from operation in a first communication configuration to operating in a second communication configuration in accordance with the command.

Figure 4:
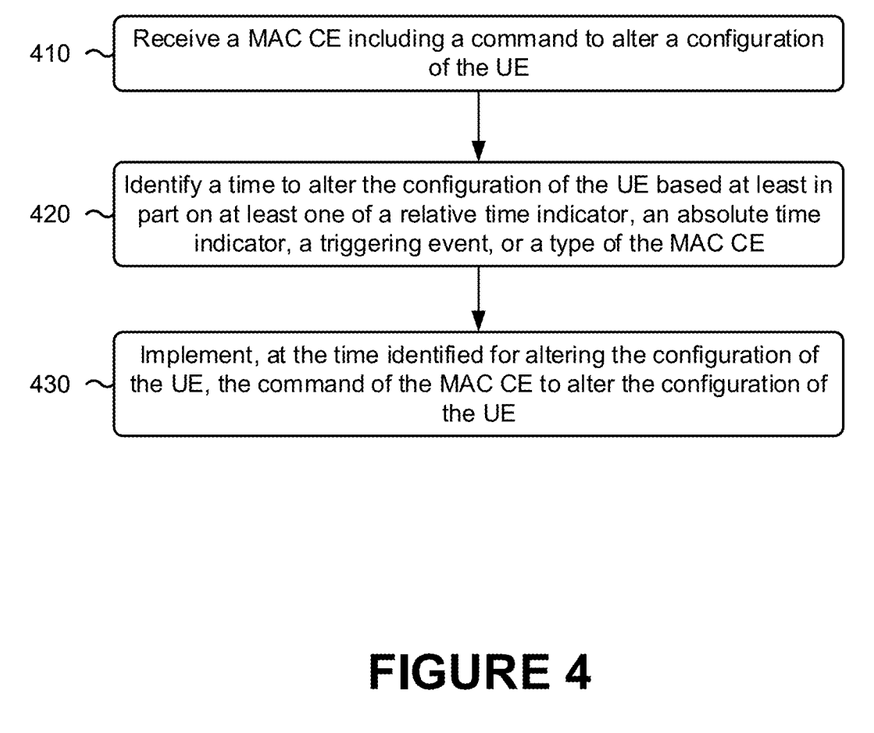
FIG. 4 is a flowchart illustrating an example process for MAC CE handling for multicast or broadcast operation performed by a UE in accordance with various aspects of the present disclosure.

FIG. 4 is a diagram illustrating an example process 400 performed, for example, by a UE, in accordance with various aspects of the present disclosure. In the example process 400, the UE, such as a UE 120, performs operations associated with MAC CE handling for multicast or broadcast operation.

As shown in FIG. 4, in some aspects, the UE receives a MAC CE including a command to alter a configuration of the UE (block 410). For example, the UE (using antenna 252, DEMOD 254, MIMO detector 256, receive processor 258, controller/processor 280, among other examples, or combinations thereof) may receive a MAC CE including a command to alter a configuration of the UE, as described above.

As further shown in FIG. 4, in some aspects, the UE may identify a time to alter the configuration of the UE based at least in part on at least one of a relative time indicator, an absolute time indicator, a triggering event, or a type of the MAC CE (block 420). For example, the UE (using controller/processor 280 among other examples) may identify a time to alter the configuration of the UE based at least in part on at least one of a relative time indicator, an absolute time indicator, a triggering event, or a type of the MAC CE, as described above.

As further shown in FIG. 4, in some aspects, the UE may implement, at the time identified for altering the configuration of the UE, the command of the MAC CE to alter the configuration of the UE (block 430). For example, the UE (using controller/processor 280 among other examples) may implement, at the time identified for altering the configuration of the UE, the command of the MAC CE to alter the configuration of the UE, as described above.

The example process may include additional aspects, such as any single aspect or any combination of aspects described below or in connection with one or more other processes described elsewhere herein.

In a first additional aspect, receiving the MAC CE includes receiving the MAC CE via a broadcast or a unicast transmission.

In a second additional aspect, alone or in combination with the first aspect, identifying the time to alter the configuration of the UE includes identifying a delay time associated with the relative time indicator, and implementing the command of the MAC CE includes implementing the command of the MAC CE after expiration of the delay time.

In a third additional aspect, alone or in combination with one or more of the first and second aspects, identifying the delay time includes identifying the delay time based at least in part on a stored configuration.

In a fourth additional aspect, alone or in combination with one or more of the first through third aspects, identifying the delay time includes identifying the delay time based at least in part on the received signaling, and the received signaling is at least one of a radio resource control message or a downlink control information message.

In a fifth additional aspect, alone or in combination with one or more of the first through fourth aspects, identifying the delay time includes identifying the delay time based at least in part on the type of the MAC CE.

In a sixth additional aspect, alone or in combination with one or more of the first through fifth aspects, identifying the time to alter the configuration of the UE includes identifying the time based at least in part on the absolute time indicator.

In a seventh additional aspect, alone or in combination with one or more of the first through sixth aspects, the MAC CE includes information identifying the absolute time indicator.

In an eighth additional aspect, alone or in combination with one or more of the first through seventh aspects, the absolute time indicator is at least one of a system frame number, a slot number, a set of least significant bits of the system frame number, or a set of least significant bits of the slot number.

In a ninth additional aspect, alone or in combination with one or more of the first through eighth aspects, the example process includes receiving a time information broadcast and determining the time based at least in part on the absolute time indicator and the time information broadcast, wherein the absolute time indicator identifies an offset to the time information broadcast.

In a tenth additional aspect, alone or in combination with one or more of the first through ninth aspects, the absolute time indicator identifies a value for a coordinated universal time.

In an eleventh additional aspect, alone or in combination with one or more of the first through tenth aspects, the example process includes monitoring a transmission corresponding to at least one radio network temporary identifier (RNTI) and determining that the triggering event has occurred based at least in part on a traffic condition associated with the transmission and corresponding to the at least one RNTI transmission, wherein identifying the time to alter the configuration of the UE includes identifying the time based at least in part on determining that the triggering event has occurred.

In a twelfth additional aspect, alone or in combination with one or more of the first through eleventh aspects, the at least one RNTI transmission includes at least one of a group radio network temporary identifier (G-RNTI) or a cell radio network temporary identifier (C-RNTI).

In a thirteenth additional aspect, alone or in combination with one or more of the first through twelfth aspects, the example process includes transmitting a physical uplink control channel for a multimedia broadcast multicast service point to multipoint radio bearer to indicate that the command is implemented.

In a fourteenth additional aspect, alone or in combination with one or more of the first through thirteenth aspects, receiving the MAC CE includes receiving the MAC CE via a unicast transmission, and identifying the time to alter the configuration of the UE includes identifying the time based at least in part on the unicast transmission.

Figure 5:
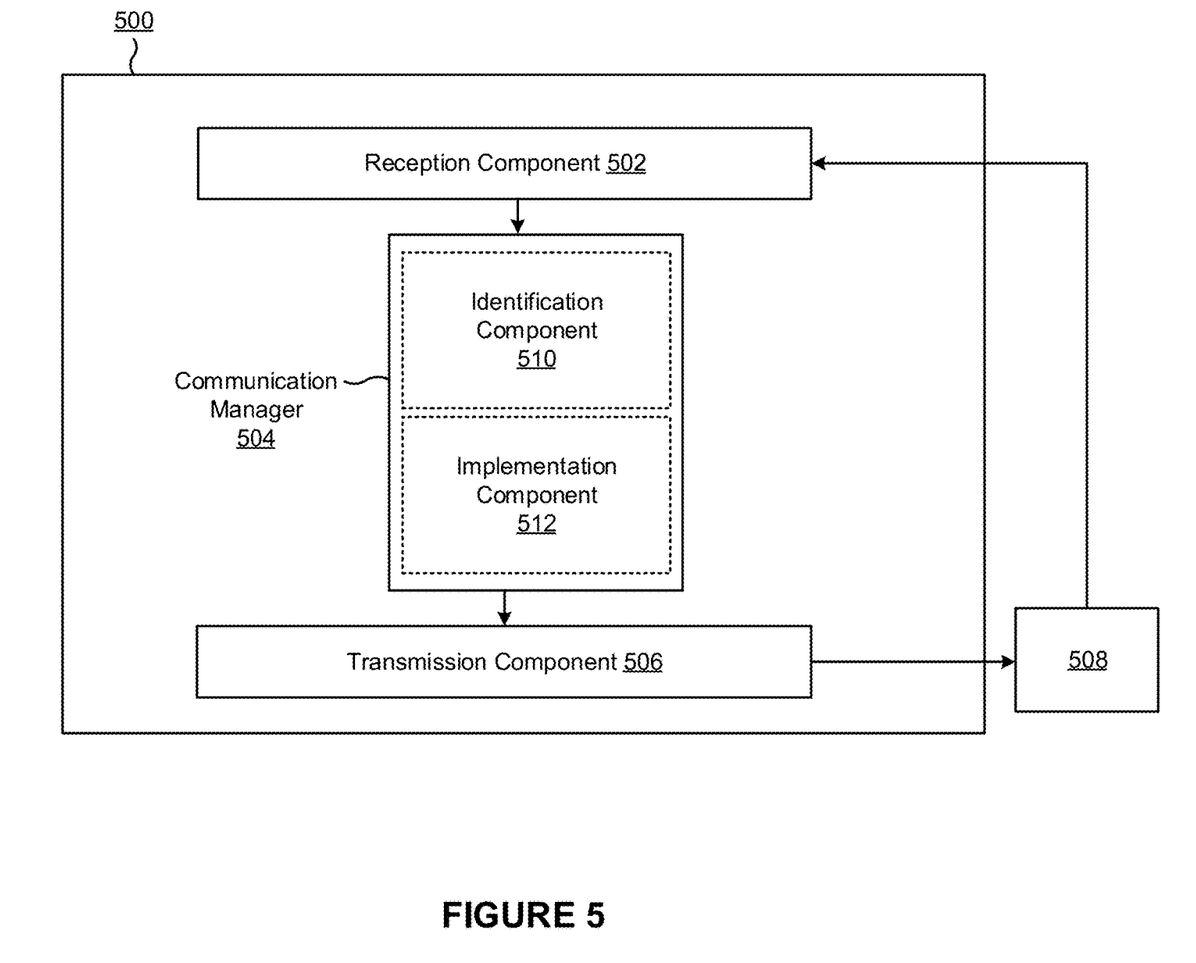
FIG. 5 is a diagram illustrating an example apparatus according to various aspects of the present disclosure.

FIG. 5 is a block diagram of an example apparatus 500 for wireless communication in accordance with various aspects of the present disclosure. The apparatus 500 may be a UE, or a UE may include the apparatus 500. In some aspects, the apparatus 500 includes a reception component 502, a communication manager 504, and a transmission component 506, which may be in communication with one another (for example, via one or more buses). As shown, the apparatus 500 may communicate with another apparatus 508 (such as a UE, a base station, or another wireless communication device) using the reception component 502 and the transmission component 506.

In some aspects, the apparatus 500 may be configured to perform one or more operations described herein in connection with FIG. 3. Additionally or alternatively, the apparatus 500 may be configured to perform one or more processes described herein, such as process 400 of FIG. 4, among other examples. In some aspects, the apparatus 500 may include one or more components of the UE described above in connection with FIG. 2.

The reception component 502 may receive communications, such as reference signals, control information, data communications, or a combination thereof, from the apparatus 508. The reception component 502 may provide received communications to one or more other components of the apparatus 500, such as the communication manager 504. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 502 may include one or more antennas, a demodulator, a MIMO detector, a receive processor, a controller/processor, a memory, or a combination thereof, of the UE described above in connection with FIG. 2.

The transmission component 506 may transmit communications, such as reference signals, control information, data communications, or a combination thereof, to the apparatus 508. In some aspects, the communication manager 504 may generate communications and may transmit the generated communications to the transmission component 506 for transmission to the apparatus 508. In some aspects, the transmission component 506 may perform signal processing on the generated communications (such as filtering, amplification, modulation, digital-to-analog conversion, multiplexing, interleaving, mapping, or encoding, among other examples), and may transmit the processed signals to the apparatus 508. In some aspects, the transmission component 506 may include one or more antennas, a modulator, a transmit MIMO processor, a transmit processor, a controller/processor, a memory, or a combination thereof, of the UE described above in connection with FIG. 2. In some aspects, the transmission component 506 may be co-located with the reception component 502 in a transceiver.

The communication manager 504 may perform operations associated with MAC CE handling for multicast or broadcast operation. In some aspects, the communication manager 504 may include a controller/processor, a memory, a scheduler, a communication unit, or a combination thereof, of the UE described above in connection with FIG. 2.

In some aspects, the communication manager 504 may include a set of components, such as an identification component 510, an implementation component 512, or a combination thereof. Alternatively, the set of components may be separate and distinct from the communication manager 504. In some aspects, one or more components of the set of components may include or may be implemented within a controller/processor, a memory, a scheduler, a communication unit, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identification component 510 may identify a time to alter a configuration of the apparatus 500 based at least in part on a relative time indicator, an absolute time indicator, a triggering event, a type of a received MAC CE, or a combination thereof, among other examples. The implementation component 512 may implement the alteration to the configuration of the apparatus 500 at the identified time.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, or not equal to the threshold among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items among other examples, or combinations thereof), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a medium access control (MAC) control element (MAC CE) including a command to alter a configuration of the UE;
   identifying a time to alter the configuration of the UE based on a type of the MAC CE and based on radio resource control (RRC) signaling that includes information identifying a delay; and
   implementing, at the time to alter the configuration of the UE, the command of the MAC CE to alter the configuration of the UE.

2. The method of claim 1, wherein receiving the MAC CE comprises receiving the MAC CE via a broadcast or a unicast transmission.

3. The method of claim 1, wherein:
   implementing the command of the MAC CE comprises implementing the command of the MAC CE after expiration of the delay.

4. The method of claim 1, wherein the time to alter the configuration of the UE is identified further based at least in part on a stored configuration.

5. The method of claim 1, further comprising:
   receiving the RRC signaling, wherein the delay is relative to one or more other communication parameters.

6. The method of claim 1, wherein the time to alter the configuration of the UE is identified further based at least in part on an absolute time indicator.

7. The method of claim 6, wherein the MAC CE includes information identifying the absolute time indicator.

8. The method of claim 6, wherein the absolute time indicator is at least one of a system frame number, a slot number, or a set of least significant bits of the system frame number.

9. The method of claim 6, further comprising:
   receiving a time information message, wherein the absolute time indicator identifies an offset to the time information message.

10. The method of claim 6, wherein the absolute time indicator identifies a value for a coordinated universal time.

11. The method of claim 1, further comprising:
    monitoring a transmission corresponding to at least one radio network temporary identifier (RNTI) transmission; and
    determining that a triggering event has occurred based at least in part on a traffic condition associated with the transmission corresponding to the at least one RNTI, wherein the time to alter the configuration of the UE is identified further based at least in part on determining that the triggering event has occurred.

12. The method of claim 11, wherein the at least one RNTI includes at least one of a group RNTI or a cell RNTI.

13. The method of claim 1, further comprising transmitting a physical uplink control channel for a multimedia broadcast multicast service point to multipoint radio bearer to indicate that the command is implemented.

14. The method of claim 1, wherein receiving the MAC CE comprises receiving the MAC CE via a unicast transmission, and wherein the time to alter the configuration of the UE is identified further based at least in part on the unicast transmission.

15. A user equipment (UE) for wireless communication, comprising:
    a memory; and
    one or more processors, coupled with the memory, configured to:
      receive a medium access control (MAC) control element (MAC CE) including a command to alter a configuration of the UE;
      identify a time to alter the configuration of the UE based on a type of the MAC CE and based on radio resource control (RRC) signaling that includes information identifying a delay; and
      implement, at the time to alter the configuration of the UE, the command of the MAC CE to alter the configuration of the UE.

16. The UE of claim 15, wherein the one or more processors are configured to receive the MAC CE via a broadcast or a unicast transmission.

17. The UE of claim 15,
    wherein, when implementing the command of the MAC CE, the one or more processors are configured to:
      implement the command of the MAC CE after expiration of the delay.

18. The UE of claim 15, wherein the time to alter the configuration of the UE is identified further based at least in part on a stored configuration.

19. The UE of claim 15, wherein the one or more processors are further configured to:
    receive the RRC signaling, wherein the delay is relative to one or more other communication parameters.

20. The UE of claim 15, wherein the time to alter the configuration of the UE is identified further based at least in part on an absolute time indicator.

21. The UE of claim 20, wherein the MAC CE includes information identifying the absolute time indicator.

22. The UE of claim 20, wherein the absolute time indicator is at least one of a system frame number, a slot number, or a set of least significant bits of the system frame number.

23. The UE of claim 20, wherein the one or more processors are further configured to:
    receive a time information broadcast, wherein the absolute time indicator identifies an offset to the time information broadcast.

24. The UE of claim 20, wherein the absolute time indicator identifies a value for a coordinated universal time.

25. The UE of claim 15,
    wherein the one or more processors are further configured to:
      monitor a transmission corresponding to at least one radio network temporary identifier (RNTI) transmission; and
      determine that a triggering event has occurred based at least in part on a traffic condition associated with the transmission corresponding to the at least one RNTI, and
    wherein the time to alter the configuration of the UE is identified further based at least in part on determining that the triggering event has occurred.

26. The UE of claim 25, wherein the at least one RNTI includes at least one of a group RNTI or a cell RNTI.

27. The UE of claim 15, wherein the information identifying the delay is an offset parameter.

28. The UE of claim 15, wherein the time to alter the configuration of the UE is identified further based at least in part on a slot number.

29. A non-transitory computer-readable medium storing one or more instructions for wireless communication, the one or more instructions comprising:
   one or more instructions that, when executed by one or more processors of a user equipment (UE), cause the one or more processors to:
      receive a medium access control (MAC) control element (MAC CE) including a command to alter a configuration of the UE;
      identify a time to alter the configuration of the UE based on a type of the MAC CE and based on radio resource control (RRC) signaling that includes information identifying a delay; and
      implement, at the time to alter the configuration of the UE, the command of the MAC CE to alter the configuration of the UE.

30. An apparatus for wireless communication, comprising:
   means for receiving a medium access control (MAC) control element (MAC CE) including a command to alter a configuration of the apparatus;
   means for identifying a time to alter the configuration of the apparatus based on a type of the MAC CE and based on radio resource control (RRC) signaling that includes information identifying a delay; and
   means for implementing, at the time to alter the configuration of the apparatus, the command of the MAC CE to alter the configuration of the apparatus.

* * * * *